Jan. 12, 1960     R. A. WITTREN     2,920,712

HYDRAULIC STEERING SYSTEM

Filed Dec. 16, 1957     2 Sheets-Sheet 1

INVENTOR.
R. A. WITTREN

United States Patent Office 2,920,712
Patented Jan. 12, 1960

2,920,712
HYDRAULIC STEERING SYSTEM

Richard A. Wittren, Waterloo, Iowa, assignor, by mesne assignments, to Deere & Company, a corporation of Delaware Application December 16, 1957, Serial No. 703,082

9 Claims. (Cl. 180—79.2)

This invention relates to a hydraulic steering system for vehicles and more particularly to a system that is capable of being operated by a power driven pump or manually in the event of failure of the pump.

Hydraulic steering systems are known which operate on the principle employing a control valve actuated by the steering wheel for mobilizing and demobilizing a fluid motor having mechanical connection to the steerable wheels of the vehicle, plus the provision of a pump driven by the steering wheel for furnishing emergency pressure in the event of failure of the engine-driven pump. A typical system of that character normally employs a gear pump driven by the steering wheel or steering shaft and because of the characteristics of this pump, several problems occur in the system, foremost of which are leakage due to the nature of the pump and unsatisfactory manual steering, also due to the nature of the pump. Both of these problems can be solved by the use of high-cost pumps but that solution necessarily entails the addition of cost to already expensive systems. According to the present invention, the problems are eliminated and reasonable cost is attained by the use of a cylinder and piston motor in place of the gear pump, thus exploiting the characteristics of this type of motor as respects improved seals, which eliminates leakage and enables the achievement of better manual control. Another feature of the invention is the provision of valve means operative, when the engine driven pump fails, to connect the return line to the pressure line so as to complete a closed manual steering circuit. A still further feature is the employment of a second steering motor in parallel with the basic steering motor for obtaining increased output torque at the steerable wheel means.

The foregoing and other important objects and desirable features inherent in and encompassed by the invention will become apparent as a preferred embodiment thereof is disclosed in detail in the ensuing description and accompanying sheets of drawings, the figures of which are described immediately below.

Figure 1:
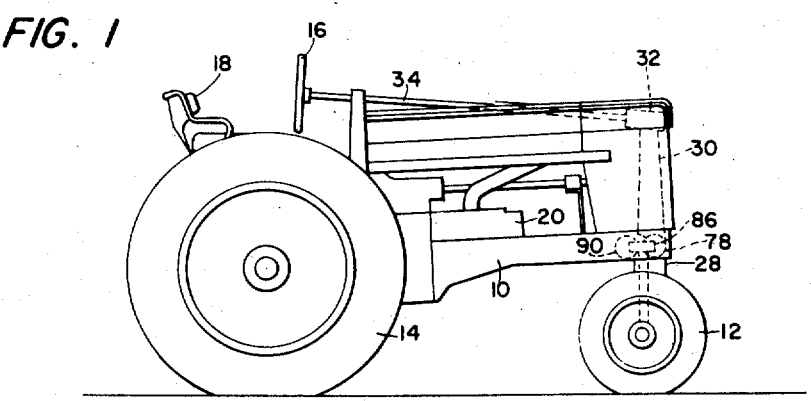
Fig. 1 is a side elevation, on a reduced scale, of a typical agricultural tractor embodying the improved system.

The tractor chosen for purposes of illustration is a commercially popular agricultural tractor having a main body 10 carried on front and rear wheels 12 and 14 respectively, the front wheels representing, for purposes of the present disclosure, steerable wheel means under control of a steering wheel 16 proximate to an operator's station 18. The tractor is powered by an internal combustion engine 20 which serves additionally as a power source for driving a pump 22 (Fig. 4) for pressurizing the hydraulic steering system. The pump 22 may be connected to the engine 20 by any suitable mechanical connection represented schematically by a broken line 24 in Fig. 4. The hydraulic pressure source including the pump 22 is augmented of course by a suitable reservoir, represented schematically at 26.

The steerable wheel means represented by the front wheels 12 are of the truck type (although, they may be otherwise) mounted on a support 28 turnable about an upright axis and appropriately carried in forward pedestal structure 30, the upper portion of which affords a housing 32 which is penetrated by a steering shaft 34 that is connected to the steering wheel 16. The foregoing is entirely representative only, because the basic structure may be different if desired.

As illustrated here, the housing structure 32 may incorporate or otherwise support a slave motor indicated in its entirety by the numeral 36 and comprising a two-way cylinder 38 and a piston 40. The piston has a hollow piston rod 42 which, by means of suitable bearings 44, journals a steering shaft extension 46. A portion of the housing structure 32, as at 48, rotatably mounts the steering shaft 34 in such manner as to prevent axial movement thereof, and the connection between the shaft 34 and the shaft extension 46 involves a key or spline at 50 so arranged that the shaft extension 46 turns with the steering shaft 34 but has relative axial movement.

The housing structure 32 includes an extension 52 having a cap 54 which additionally journals at 56 the forward end of the shaft extension 46, and within the cap 54, the shaft extension has pinned thereto an actuating collar 58. A wall 60 and an internal surface 62 provide axially spaced apart stops or abutments which are respectively engageable by opposite radial faces of the collar 58 to establish axial limits on axial movement of the shaft extension 46.

An intermediate portion of the shaft extension 46 is threaded, at 64, and a nut 66 is threaded onto the threaded portion 64 and is pinned to the forward end of the hollow piston rod 42 by any convenient means, such as a pin 68. The nut 66 is thus constrained for axial movement with the piston 40 and hollow piston rod 42. In addition, means is provided for preventing rotation of the nut 66, this means in the present case comprising appropriate guide means or tracks 70 in the housing extension 52 and rollers or followers 72 on the nut and running in the tracks.

From the description thus far, it will be seen that if the piston 40 is held and the steering wheel 16 turned, the steering shaft 34 and interconnected shaft extension 46 will tend to shift axially because of the threaded means established by the threaded portion 64 and the nut 66. Since the shaft 34 is preferably held against axial displacement at 48, the shaft extension 46 alone will shift axially, because of the keyed connection at 50. Rotation of the steering shaft in one direction will cause the collar 58 to shift correspondingly, and the reversal of the steering shaft will shift the collar in the other direction. In the preferred example illustrated, turning of the steering wheel in a clockwise direction as viewed from the operator's station results in shifting of the shaft extension 46 forwardly for a right turn of the steerable wheel means 12, the threaded portion 64 being a right hand thread. Turning of the steering wheel in a counterclockwise direction will shift the shaft extension and collar 58 rearwardly, effecting a left hand turn.

Figure 4:
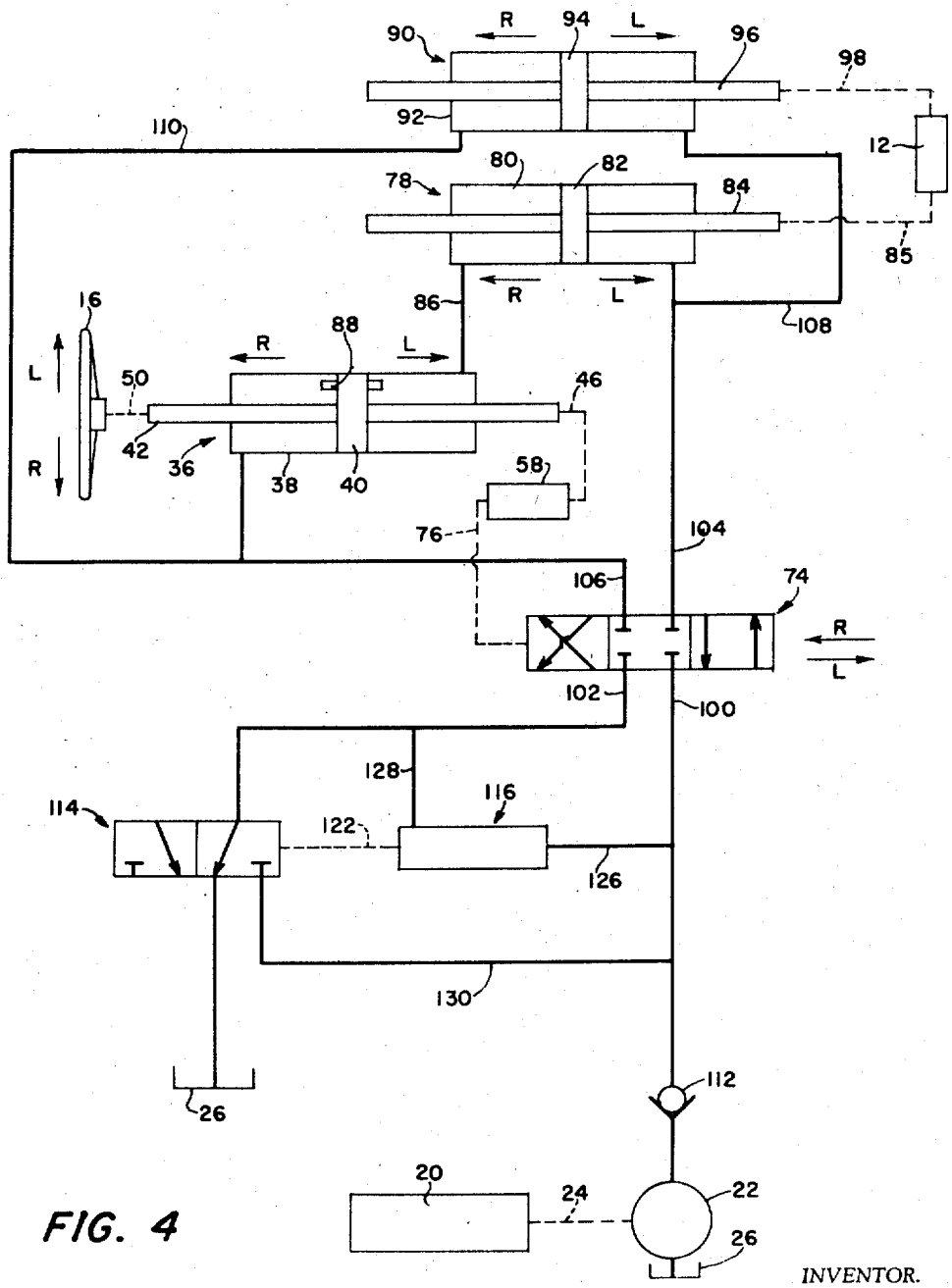
Fig. 4 is a schematic diagram illustrating the entire circuit and its components.

The actuator collar 58 on the steering shaft extension 46 is appropriately connected to a main control valve means, indicated in its entirety and schematically at 74 in Fig. 4. The connection may include a lever 76 which is responsible for reversal of direction of the valve means 74 as respects the direction of shifting of the collar 58

That is to say, although, on a right turn, the shaft extension 46 shifts forwardly to carry the collar 58 forwardly, the lever 76 moves the valve means 74 rearwardly for the right turn. Here again, the mechanism is representative only, and typical connections are otherwise available. The components 46, 58 and 76 are illustrated schematically in Fig. 4 to illustrate the broad relationship thereof to the control valve means 74.

The hydraulic steering system further includes a two-way hydraulic steering motor 78 which comprises a cylinder 80, piston 82 and piston rod 84. The piston rod 84 is connected by any suitable mechanical connection, illustrated schematically at 85 in Fig. 4, to the steerable wheel means 12, likewise illustrated schematically in that figure. The cylinders 38 and 80 of the slave and steering motors 36 and 78, respectively, are of equal displacement and proximate ends thereof are serially connected by a serial fluid line 86, so that movement of the piston 40 forwardly, as for a left hand turn, incurs forward movement of the piston 82. Likewise, the pistons 40 and 82 will move rearwardly in unison to effect a left hand turn. The piston 40 may incorporate therein any suitable phasing or synchronizing valve means suggested here at 88. The motor 78 may be conveniently located at a forward portion of the tractor, as illustrated at dotted lines in Fig. 1. This location affords a convenient place for the mounting of an auxiliary motor 90 which, like the motors 36 and 78 is of the cylinder and piston type, having a cylinder 92, a piston 94 and a piston rod 96, the latter having a suitable mechanical connection as at 98 (Fig. 4) to the steerable wheel means 12.

The valve means 74 has at one side thereof a pressure line 100 connected to the pump 22 and a return line 102 connected to the reservoir 26. At its other side, the valve means 74 has motor lines 104 and 106, and these are connected respectively to the motors 36 and 78 at the ends thereof opposite to the ends to which the serial connection 86 is effected. The auxiliary motor 90 is connected to the circuit in parallel with the steering motor 78, as by fluid lines 108 and 110. The pump 22 as selected for illustrative purposes is of the variable displacement type and the pressure line 100 incorporates a non-return check valve 112, for purposes to become presently apparent. The pressure source may, of course, be of any suitable type.

Figure 3:
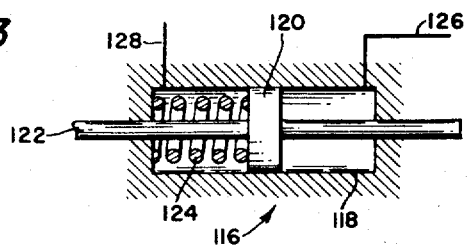
Fig. 3 is an enlarged section of the valve actuator for converting the system from power steering to manual steering.

It is a feature of the invention to include in the return line 102 a conversion valve means indicated in its entirety by the numeral 114, here under control of a differential type cylinder and piston assembly indicated in its entirety at 116 and shown in section in Fig. 3. This assembly includes a cylinder 118 having a piston 120 provided with a piston rod 122 which effects the mechanical connection to the valve means 114. The piston 120 has opposite faces of equal area but is biased in one direction as by a coiled compression spring 124. The piston 120 divides the cylinder 118 into opposite chambers, one of which is connected by a line 126 to the pressure line 100 and the other of which is connected to the return line 102 by a line 128. A by-pass line 130 is connected to one side of the valve means 114 and to the pressure line 100 in by-passing relation to the reservoir 26, pump 22 and non-return valve 112.

*Operation*

Figure 2:
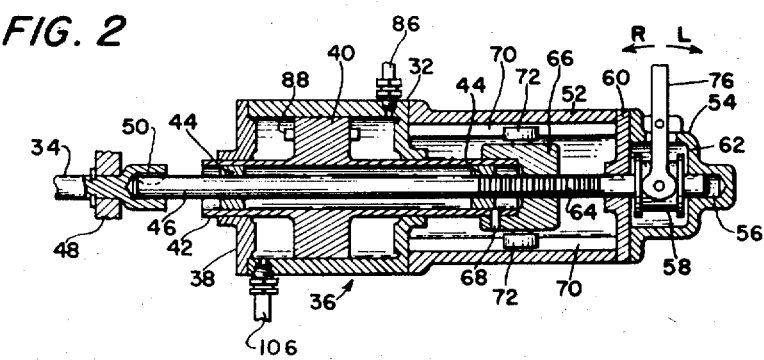
Fig. 2 is an enlarged sectional view through the slave motor, showing its association with the actuating means for the main control valve.

A right turn powered by the pump 22 under control of the valve means 74 is effected by turning of the steering wheel 16 in a clockwise direction as viewed from a position on the operator's station 18. The resistance of the front wheels to turning acts through the hydraulic system to hydraulically lock the piston 40 in the slave motor 36, which thus temporarily fixes the position of the piston 40 as well as that of the nut 66. Because of the right hand thread at 64, turning of the steering wheel 34 in the direction indicated causes an advance of the steering shaft extension 46, thus shifting the collar 58 forwardly and rocking the lever 76 in the direction of the letter R in Fig. 2, thereupon shifting the valve means 74 in the direction R in Fig. 4 to an active position in which the pressure line 100 connects to the motor line 104 and the return line 102 connects to the other motor line 106. Fluid under pressure is thus transmitted to the forward end of the steering motor 78, moving the piston 82 rearwardly, and fluid from the rear end of the motor 78 flows serially through the line 86 to the forward end of the slave motor 36. The piston in that motor moves rearwardly and, if the operator stops turning the steering shaft 34, rearward movement of the piston 40 will act through the threaded connection 66—64 to move the shaft extension 46 also rearwardly, reversing the movement of the lever 76 and returning the valve means 74 to neutral. This affords a follow-up action for neutralizing the valve means whenever the operator ceases turning the steering wheel 16. If the operator continues to turn the steering wheel 16, the collar 58 will continue to be shifted forwardly so as to shift the valve member 74 rearwardly and to retain the ability of the system to accomplish the pump-powered right turn. Increased torque at the steerable wheel means 12 is afforded by the auxiliary motor 90 which, via the line 108, is connected in parallel with the steering motor 78. The motor 90 may be of any size, because of its parallel connection, and thus need not have a displacement equal to the motors 36 and 78. The phasing or synchronizing valve 88 operates in the usual manner to establish phasing or synchronizing between the pistons 40 and 82 in the event that the piston 40 should reach the end of its stroke prior to the piston 82.

A power left turn may be achieved in a manner just the reverse of that described. That is, the steering wheel 16 is turned in a counterclockwise direction as viewed from the operator's station, resulting in rearward displacement of the steering shaft extension 46 to operate through the collar 58 and lever 76 to shift the valve means 74 forwardly or in the direction L (Fig. 4). This establishes a connection between the pressure line 100 and motor line 106 and between the motor line 104 and the return line 102, causing the slave cylinder piston 40 to move forwardly and pressurizing the steering motor 78 at the same side so that its piston 82 also moves forwardly. Since the line 110 is connected in parallel with the line 106, the piston 92 in the auxiliary motor 90 will also move forwardly to add to the torque applied to the steerable wheel means 12.

In both of the foregoing instances, the valve means 114 is in the position shown in Fig. 4, wherein the reservoir line 102 is connected across the valve 114 to the reservoir 26. This result obtains because pressure through the line 126 from the pressure line 100 urges the piston 120 in the actuator assembly 116 to the left and against the bias of the spring 124, it being understood that there is only reservoir pressure in the line 128. Consequently, as long as pressure is being developed by the pump 22 in the pressure line 100, the valve means 114 is in the power steering position illustrated in Fig. 4.

In the event that the pump 22 fails for any reason, the line 126 will not be pressurized and the spring 124 will consequently move the piston 120 to the right, shifting the valve means 114 to the right so that the return line 102 is connected across 114 to the bypass line 130. This condition will obtain to establish manual steering in the absence of pressure developed by the pump 22.

In such instance, turning of the steering wheel 16 in a clockwise direction as viewed from a position on the operator's station 18 will, as before, initially shift the valve means 74 to the rear for a right turn. At this time, the collar 58 will have shifted forwardly to its maximum extent, as determined by its engagement with the front wall 62 of the housing cap 54, thus fixing the shaft extension 48 against further forward shifting. Hence, continued rotation of the steering wheel will cause the piston 40 to be propelled rearwardly via the threaded connection 64—66, thus pressurizing the line 106 which, as already indicated, is connected to the return line 102 at the valve 74. Since the valve means 114 is to the right as respects its position in Fig. 4, the return line 102 is connected to the bypass line 130 and this in turn carries the fluid pressure to the pressure line 100 and thence to the motor line 104 which leads to the right hand or forward end of the steering motor 78, forcing the piston 82 to the rear for achieving a manually powered right turn. During this phase of operation pressure at opposite sides of the piston 92 in the auxiliary motor 90 will be equal and consequently this motor will have no effect on manual steering. The non-return valve 112, of course, prevents pressure from the connected lines 130 and 100 from returning to the pump 22.

A manually powered left turn may be achieved by turning the steering wheel 16 in a counterclockwise direction, initially shifting the valve 74 forwardly so as to connect the pressure line 100 to the motor line 106 and to connect the motor line 104 to the return line 102. The collar 58 will abut the plate or wall 60 and thus will establish a limit on rearward movement of the shaft extension 46, and continued counterclockwise rotation of the steering wheel 16 will effect forward propulsion of the slave motor piston 40, pressurizing the rear end of the steering motor 78 via the serial connection 86. Again, the valve 114 is in the position to the right of that shown in Fig. 4 and again the completed manual steering circuit is established.

The reason for the rightward position of the valve 114 in the manual steering situation is that although both lines 126 and 128 are pressurized a differential exists in favor of rightward movement of the piston 120 because of the spring 124. During power steering, the line 128, as already described, carries only reservoir pressure, and consequently leftward movement of the piston 120 prevails because of pressure in the line 126.

As already outlined generally, the slave motor 36 operates in manual steering as a pump which has many advantages over a gear pump and costwise has many advantages over other complicated pumps such as balanced gear pumps, vane pumps, etc. The use of the piston 40 as a pump piston as well as a motor piston enables the employment of conventional seals and eliminates leakage in the system, avoiding creep in the steering system to the extent of adding stability and accuracy to the position of the steerable wheel means 12. The slave motor itself is of compact unitary construction and may be readily incorporated in steering systems of the general character described. Features other than those categorically enumerated, as well as variations in the preferred embodiment disclosed, will readily occur to those versed in the art, all without departure from the spirit and scope of the invention.

What is claimed is:

1. A hydraulic steering system for a vehicle having a steering wheel and steerable wheel means, comprising: a pump; a reservoir; a two-way steering motor having a piston connected to and for steering the wheel means; a two-way slave motor equal in displacement to and serially connected at one end to one end of the steering motor and having a piston including a hollow piston rod; control valve means having pressure and return lines at one side thereof connected respectively to the pump and reservoir and a pair of motor lines at the other side thereof connected respectively to the motors at the ends thereof opposite to the serial connection therebetween and actively positionable selectively at either side of neutral to pressurize one or the other of said motor lines and to return the other motor line to the reservoir; a steering shaft connected to the steering wheel and extending axially into the hollow piston rod for rotation and for limited axial shifting relative to said hollow piston rod, said shaft having a threaded portion thereon; means connecting the steering shaft to the control valve means for positioning the latter in response to shifting of the shaft axially; a nut threaded on said threaded portion and fixed to the hollow piston rod; and means mounting the nut non-rotatably as respects the shaft so that initial turning of the steering wheel and shaft relative to the hydraulically locked slave motor piston when the control valve is in neutral causes axial shifting of the shaft to actively position the control valve means for incurring pressurizing of one or the other of the motor lines by the pump and whereby continued rotation of the steering wheel and shaft, after said shaft reaches either axial limit, acts through the nut and threaded portion to propel the slave motor piston axially so as to pump fluid to the steering motor in the absence of pressure in the pressure line.

2. The invention defined in claim 1, including: conversion valve means normally operative to lead the return line to the reservoir and operative in response to absence of pressure in the pressure line to connect the return line to said one side of the control valve means in by-passing relation to the pump and reservoir.

3. The invention defined in claim 1, including: an auxiliary two-way steering motor mechanically connected to and for assisting in steering the steerable wheel means and hydraulically connected to the slave motor and control valve means in parallel with the steering motor.

4. The invention defined in claim 1, in which: the slave motor includes a supporting housing; and the mounting means for the nut includes guide means acting between said housing and nut and paralleling the axis of the hollow piston rod to hold the nut against rotation while guiding said nut for axial movement with said hollow piston rod.

5. The invention defined in claim 1, including: conversion valve means operative selectively to lead the return line to the reservoir or to said one side of the control valve means in by-passing relation to the pump and reservoir.

6. A hydraulic steering system for a vehicle having a steering wheel and steerable wheel means, comprising: a pump; a reservoir; a two-way steering motor having a piston connected to and for steering the wheel means; a two-way slave motor equal in displacement to and serially connected at one end to one end of the steering motor and having a piston; control valve means having pressure and return lines at one side thereof connected respectively to the pump and reservoir and a pair of motor lines at the other side thereof connected respectively to the motors at the ends thereof opposite to the serial connection therebetween and actively positionable selectively at either side of neutral to pressurize one or the other of said motor lines and to return the other motor line to the reservoir; a steering shaft connected to the steering wheel and mounted for rotation and for limited axial shifting relative to the slave motor piston; means connecting the steering shaft to the control valve means for positioning the latter in response to shifting of the shaft axially; means constraining the slave motor piston for axial shifting without rotation; and means cooperative between said slave motor piston and steering shaft so that initial turning of the steering wheel and shaft relative to the hydraulically locked slave motor piston when the control valve is in neutral causes axial shifting of the shaft to actively position the control valve means for incurring pressurizing of one or the other of the motor lines by the pump and whereby continued rotation of the steering wheel and shaft, after said shaft reaches either axial limit, acts through said cooperative means to propel the slave motor piston axially so as to pump fluid to the steering motor in the absence of pressure in the pressure line.

7. The invention defined in claim 6, including: conversion valve means normally operative to lead the return line to the reservoir and operative in response to absence of pressure in the pressure line to connect the return line to said one side of the control valve means in by-passing relation to the pump and reservoir.

8. The invention defined in claim 6, including: an auxiliary two-way steering motor mechanically connected to and for assisting in steering the steerable wheel means and hydraulically connected to the slave motor and control valve means in parallel with the steering motor.

9. The invention defined in claim 6, including: conversion valve means operative selectively to lead the return line to the reservoir or to said one side of the control valve means in by-passing relation to the pump and reservoir.

References Cited in the file of this patent

UNITED STATES PATENTS

| 1,894,055 | Perkins | Jan. 10, 1933 |
| 1,899,814 | Lewis | Feb. 28, 1933 |
| 2,020,951 | Lemon | Nov. 12, 1935 |
| 2,086,814 | McCollum | July 13, 1937 |
| 2,163,892 | Sanford | June 27, 1939 |
| 2,334,918 | French | Nov. 23, 1943 |
| 2,512,979 | Strother | June 27, 1950 |